Sept. 6, 1960     F. W. SAMPSON     2,951,562
BRAKE STRUCTURE
Filed Jan. 26, 1956
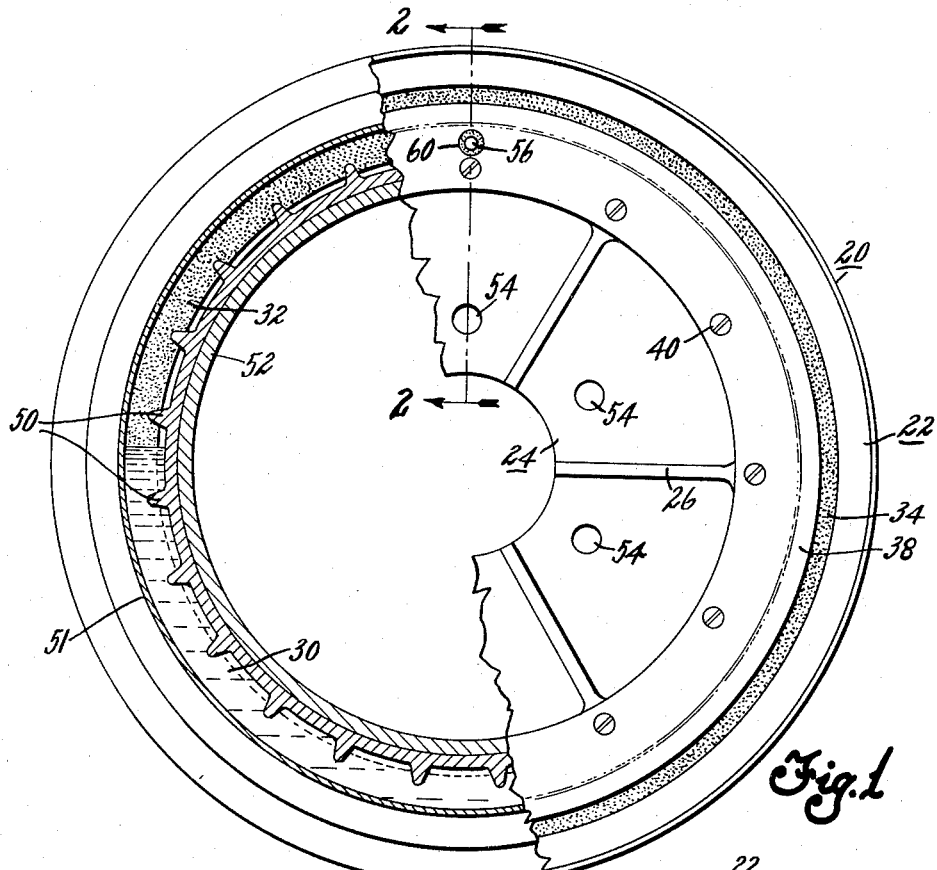
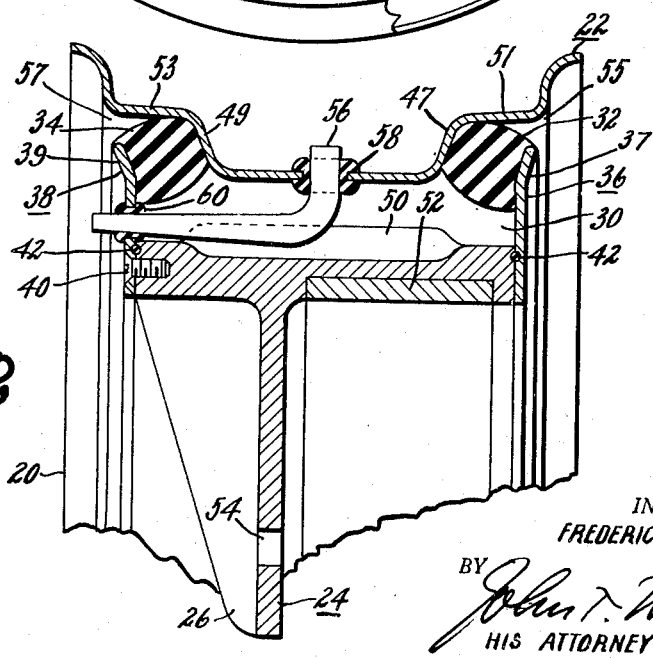
INVENTOR.
FREDERICK W. SAMPSON
BY
HIS ATTORNEY

United States Patent Office 2,951,562
Patented Sept. 6, 1960

2,951,562

BRAKE STRUCTURE

Frederick W. Sampson, Dayton, Ohio, assignor to General Motors Corporation, Detroit, Mich., a corporation of Delaware Filed Jan. 26, 1956, Ser. No. 561,554

4 Claims. (Cl. 188—264)

This invention relates to brakes and is particularly concerned with cooling means for use in connection with automotive brakes and the like.

In automotive brake applications, due to increased weight and speed of vehicles, the brakes have a tendency to overheat during repeated stopping operations from high speeds. This condition causes excessive wear of the brake lining material and also causes a change in the physical characteristics of the material whereby the friction coefficient varies so that the braking operation exhibits "fade." That is to say, on repeated stops from the same maximum speed, increasing pressures are required to maintain a uniform rate of deceleration.

Numerous expedients have been proposed to aid in cooling the brakes of an automotive vehicle and the present invention is directed to a novel means for accomplishing this end wherein cooling means are associated directly with the brake drum.

It is therefore an object of the invention to provide a wheel assembly including a rim and brake drum which are associated to provide an annular fluid reservoir therebetween.

In carrying out the above object it is a further object to associate the rim and brake drum by means of a shock absorbing mounting comprising annular rings of rubberlike material which also act as seals for sealing the reservoir.

Further objects and advantages of the present invention will be apparent from the following description, reference being had to the accompanying drawings, wherein a preferred form of the present invention is clearly shown.

In the drawings:

Figure 1 is a plan view partly in section of an automotive wheel; and

Figure 2 is a section taken on line 2—2 of Figure 1.

Referring specifically to the drawings, a wheel 20 is shown in Figure 1 which comprises a rim portion 22 and a spider or hub portion 24. The hub portion 24 is preferably formed from aluminum alloy material and may be strengthened by means of integral radial ribs 26 which have the added function of air scoops to improve the cooling effect at the braking surfaces. The hub portion 24 is dimensioned so as to be spaced from the rim portion 22 when assembled therewith to form an annular reservoir 30 therebetween which is fluid tight. This spacing is accomplished by means of annular rubberlike sealing members 32 and 34, respectively, which are bonded to a pair of annular plates 36 and 38, respectively, that are mounted to a hub portion 24 by means of a plurality of screws 40 or otherwise suitably secured. In order to seal the plates 36 and 38 to the hub 24, a pair of O rings 42 may be interposed between the plates and hub portion. The plates 36 and 38 are metal, preferably steel.

The rubber sealing members 32 and 34 are dimensioned so as to be a tight compressive fit against the shouldered portions of the rim 22 when the assembly is complete. This places the rubber under high compression and not only provides a seal for the reservoir 30 but likewise provides for a shock absorbing connection or cushion during use of the wheel.

The shape of the rim 22 adjacent the area of contact with the seal is as shown at 51 and 53. This outward taper from the vertically tapered contact surfaces 47 and 49 provides for movement of the rubberlike seals under compression and the slope thereof controls to some extent the cushioning effect. The annular gaps 55 and 57 which extend around the wheel may be termed "safety gaps" to permit flexibility and to prevent "bottoming" of the rings 36 or 38 against the rim 22. The particular cooperative configuration of the rim 22, hub 24, annular rings 36 and 38 and rubberlike seals 32 and 34 is important to the successful operation of the assembly.

It will also be noted that rings 36 and 38 are flared outwardly at 37 and 39, respectively, adjacent the part thereof where the rubber seals are bonded. This flaring also aids in controlling deflection to improve the cushioning effect.

Attention is also directed to the vertically sloped contact areas 47 and 49 which cause ever-increasing compression of the seals 32 and 34 as the seals are forced toward surfaces 51 and 53 by outward movement of the hub 24 during operation of the vehicle.

Around the outside of the hub 24 and within the reservoir 30 are provided a plurality of baffles 50, which may be integrally formed with the hub, so that when the reservoir 30 is partially filled with fluid to improve heat transfer, the baffles 50 will break up the centrifugal flow of this material upon changes in rate of rotation of the wheel thereby enhancing the cooling effect.

In order to provide a satisfactory braking surface on the hub portion 24 a suitable liner 52 may be inserted therein. This liner is preferably ferrous in nature, such as cast iron, and acts as the braking surface against which the brake band operates when the wheel is assembled on a vehicle. This may be accomplished by the use of bolts which pass through the apertures 54 adjacent the center of the spider or hub and which attach the wheel to an axle, not shown.

The rim 22 is made of steel and accommodates a tubeless tire. A valve stem 56 is provided which is sealed as it passes through the reservoir by means of rubberlike seals 58 and 60.

The annular members 32 and 34 are made of any suitable elastomeric rubberlike material such as butadiene styrene copolymers, butadiene acryonitrile copolymers, polychloroprene, natural rubber, etc., alone or in combination and suitably compounded. The bonding of the members 32 and 34 to the rings 36 and 38 is accomplished by using a suitable adhesive cement together with heat and pressure to obtain a strong bond. Brass plating or other preparatory surface treatment of the metal rings prior to bonding may be used if desired.

Since the particular rubberlike compounds for these uses are well known in the art, they form no part of this invention. Similarly, bonding procedures are widely known in connection with motor mounts, bushings, etc., and likewise are not a part of the invention which is limited to a cushioned wheel having a fluid reservoir built therein which is in heat transfer relation to the brake drum.

The fluid may be water, water alcohol, brake fluid, vegetable oils, etc., or any other suitable material for the climate in which the device is to be used. In all instances the choice of rubberlike material for the several seals must be made with the fluid in mind so that the fluid will not have any deleterious effects thereon. In most cases the butadiene acrylonitrile compounds are preferred.

From the foregoing it is apparent that I have provided an inexpensive assembly which provides a fluid reservoir surrounding the brake drum which aids in the cooling of the brake drum and thereby maintains the temperature of the brake assembly at a reduced temperature with respect to temperatures that would normally be attained where no cooling reservoir is provided.

While the forms of embodiment of the invention as herein disclosed constitute preferred forms, it is to be understood that other forms might be adopted, as may come within the scope of the claims which follow.

What is claimed is as follows:

1. A wheel assembly comprising in combination, a rim member, a hub member with radiating fins formed thereon and having an outer diameter of less dimension than the inner diameter of the rim, said hub member having baffles on its outer periphery, a pair of opposed resilient sealing rings compressively engaged between outer edges of said rim and hub as the sole supporting means of said rim and holding said rim and hub in spaced relation thereby forming an annular fluid reservoir, said resilient sealing rings bonded to said hub member and mounted in a position to permit radial flexing of said sealing rings, a brake drum in firm contact with the inner diameter of said hub, a heat transfer fluid partially filling said reservoir thereby providing a heat transfer means from said brake drum to said fins for radiation to the atmosphere.

2. A wheel assembly comprising in combination, a hub member having cooling fins for radiating heat, a brake drum carried by said hub member, a rim member concentric with and in spaced relation to said hub member, a pair of annular rubberlike seals placed between said hub member and said rim member as a sole supporting connection for maintaining said rim and said hub members in spaced relation and forming a fluid-tight reservoir therebetween, said rubber-like seals bonded to said hub member and mounted in a compressive position between said two members, said rim member having symmetrical seating portions each including a horizontal wall adjoining a vertically inclined wall which engages each of said seals to leave an annular wedge-shaped gap between said horizontal wall of said rim and said portion of said seal engaging said hub member, said wedge-shaped gap to permit flexing of said seals and momentary eccentricity of said rim member relative to said hub member, a heat transfer medium partially filling said reservoir and adapted for transfer of heat generated on said brake drum to said radiating fins on said hub member.

3. A wheel assembly comprising in combination, a hub member having cooling fins for radiating heat from said hub member, a brake drum carried on said hub member, a rim member mounted concentrically with said hub member and in spaced relation to said hub member, a pair of annular rubber-like seals interposed between said hub member and said rim member providing the sole supporting means for said rim member and maintaining said members in spaced relation to each other and thereby providing a fluid-tight reservoir, said annular rubber-like seals bonded to said hub member and provided for a radially flexing motion of said seals and relative movement of said rim member relative to said hub member, said hub member provided with baffles on its outer periphery, a heat transfer medium partially filling said reservoir and adapted to transfer heat from said brake drum to said radiating fins and thereby providing a cooling means for said brake structure.

4. A wheel assembly comprising in combination, a hub member having laterally extending cooling fins for radiating heat, said hub member having lateral terminating faces, a brake drum carried by said hub member and extending laterally from said fins on said hub member, a pair of annular plates, one of said plates being fastened and sealed to each of said hub lateral terminating faces, each of said plates being of a larger diameter than that of said hub member and having a flared portion at the terminating periphery thereof, a rim member concentric with and in spaced relation to said hub member, a pair of annular rubber-like seals placed between said plates and said rim member as a sole supporting connection for maintaining said rim and said hub members in spaced relation forming a fluid-tight reservoir therebetween, said rubber-like seals being bonded to said plate members and mounted in a compressive position between said rim and said plate members, said rim member having symmetric seating positions each including a horizontal wall adjoining a vertically inclined wall which engages each of said seals to leave an annular wedge-shaped gap between said horizontal wall of said rim and said portion of said seal engaging said plate members, said annular rubber-like seals being positioned on said plate members to provide a substantial space between said seals and said hub member, said wedge-shaped gap and said space permitting flexing of said seals and momentary eccentricity of said rim member relative to said hub member, and a heat transfer medium partially filling said reservoir and adapted for transfer of heat generated on said brake drum to said radiating fins on said hub member.

References Cited in the file of this patent

UNITED STATES PATENTS

| | | |
|---|---|---|
| 1,841,336 | Musselman | Jan. 12, 1932 |
| 1,843,621 | Norton | Feb. 2, 1932 |
| 2,041,457 | Cautley | May 19, 1936 |
| 2,105,317 | Frank | Jan. 11, 1938 |
| 2,160,912 | Sargent et al. | June 6, 1939 |
| 2,372,984 | Pierce | Apr. 3, 1945 |
| 2,406,303 | Levy | Aug. 20, 1946 |
| 2,479,795 | Vrooman | Aug. 23, 1949 |
| 2,609,856 | Paton | Sept. 9, 1952 |
| 2,834,636 | Fawick | May 13, 1958 |
| 2,891,593 | Deuring et al. | June 23, 1959 |

FOREIGN PATENTS

| | | |
|---|---|---|
| 1,053,995 | France | Oct. 7, 1953 |
| 855,958 | Germany | Nov. 17, 1952 |
| 667,280 | Great Britain | Feb. 27, 1952 |